(12) United States Patent
Pötter et al.

(10) Patent No.: US 8,378,536 B2
(45) Date of Patent: Feb. 19, 2013

(54) MILL DRIVE SYSTEM

(75) Inventors: Friedhelm Pötter, Bergkamen (DE); Joachim Ridder, Bocholt (DE)

(73) Assignee: Siemens Aktiengesellschaft, München (DE)

( * ) Notice: Subject to any disclaimer, the term of this patent is extended or adjusted under 35 U.S.C. 154(b) by 356 days.

(21) Appl. No.: 12/879,243

(22) Filed: Sep. 10, 2010

(65) Prior Publication Data

US 2011/0068645 A1  Mar. 24, 2011

Related U.S. Application Data

(60) Provisional application No. 61/260,976, filed on Nov. 13, 2009.

(30) Foreign Application Priority Data

Sep. 10, 2009  (EP) ..................................... 09011589

(51) Int. Cl.
*H02K 9/00* (2006.01)
(52) U.S. Cl. ................................ 310/57; 310/43; 310/45
(58) Field of Classification Search .................... 310/52, 310/54, 57, 43, 45
See application file for complete search history.

(56) References Cited

U.S. PATENT DOCUMENTS

| | | | | | |
|---|---|---|---|---|---|
| 4,572,442 | A | * | 2/1986 | Sigg | 241/117 |
| 5,053,661 | A | * | 10/1991 | Kitamura et al. | 310/83 |
| 5,111,090 | A | * | 5/1992 | Otake et al. | 310/54 |
| 5,189,325 | A | * | 2/1993 | Jarczynski | 310/54 |
| 5,490,319 | A | * | 2/1996 | Nakamura et al. | 29/596 |
| 5,524,840 | A | * | 6/1996 | Gygi | 241/117 |
| 5,682,074 | A | * | 10/1997 | Di Pietro et al. | 310/215 |
| 6,329,731 | B1 | * | 12/2001 | Arbanas et al. | 310/52 |
| 6,579,202 | B2 | * | 6/2003 | El-Antably et al. | 475/159 |
| 7,884,511 | B2 | * | 2/2011 | Mogi et al. | 310/54 |

FOREIGN PATENT DOCUMENTS

| | | |
|---|---|---|
| DE | 39 31 116 A1 | 3/1991 |
| DE | 10 2009 034.158.7 | 2/2001 |
| DE | 103 05 915 A1 | 8/2004 |
| JP | 2005052799 A | 3/2005 |
| WO | WO 2008/031694 A1 | 3/2008 |
| WO | WO 2009/068484 A1 | 6/2009 |

* cited by examiner

*Primary Examiner* — Dang Le

(57) ABSTRACT

A mill drive system with a transmission arranged beneath a milling table and with at least one planetary and/or spur gear stage as well as a vertical shaft position is provided. In addition, an electric motor is integrated in a housing of the transmission and is connected to a lubricant supply circuit of the transmission. A rotor and a stator of the electric motor have vertically extending axes. Cooling of the motor is performed by a lubricant circulating through the transmission. Furthermore, a lubricating-oil-proof sheath for rotor and/or stator windings of the electric motor for sealing with respect to the lubricant is provided. In addition, the mill drive system includes a converter with a regulation device for backlash-free speed regulation of the electric motor.

20 Claims, 2 Drawing Sheets

MILL DRIVE SYSTEM

CROSS REFERENCE TO RELATED APPLICATIONS

The application claims the benefit of the provisional patent application filed on Nov. 13, 2009, and assigned application No. 61/260,976. This application also claims priority of European Patent Office Application No. 09011589.0 EP filed Sep. 10, 2009. All of the applications are incorporated by reference herein in their entirety.

FIELD OF INVENTION

The claimed invention relates to a mill drive system and a geared motor for such a mill drive system.

BACKGROUND OF INVENTION

Known mill drive systems comprise one or more transmission stages for drive power conversion of an electric motor. The transmission stages and the electric motor in this case form a drive train, which is coupled tightly to a processing process within, for example, a bowl mill, a pug mill, a crusher, a tube mill or a tubular rotary kiln and is subjected to considerable reactions from the processing process. Generally, bevel gear stages are used for linking the electric motor to the drive train.

DE 39 31 116 A1 has described a drive apparatus for a mill with a vertical design, in which a housing of an auxiliary transmission is screwed fixedly to the mill. In this case, a precise alignment of axes, which are far apart from one another, of the drive pinion and the toothed ring is necessary. Furthermore, introducing axial mill forces via an axial thrust bearing into a common transmission housing results in considerable loads for a meshing engagement in the auxiliary transmission. As a result of a common large transmission and mill bearing interior, rapid contamination with lubricating oil for the drive apparatus is favored. In addition, a mechanical torque division in the auxiliary transmission has proven to be problematic in teems of a lack of compensation for excessive constraining forces.

JP 2005 052799 A has disclosed a drive apparatus for a vertical crusher, which is driven either via a toothed ring on a rotatable base plate or via a multi-stage bevel gear transmission. As a result of a lack of adjustment movability at an output stage of the drive apparatus, impact loads are transferred from the processing process into the drive apparatus, in particular into the toothing thereof.

WO 2009/068484 A1 has described a spur gear transmission with one or more transmission stages for driving a machine tool, enclosed by a toothed ring, which spur gear transmission comprises a transmission housing accommodating the transmission stages and a pinion which is capable of an adjustment movement, is arranged on an output shaft of an output stage and meshes with the toothed ring. The transmission housing comprises a first housing part, which is rigid per se and a second rigid housing part. The first housing part surrounds the output stage with the output shaft and the pinion, which is capable of an adjustment movement, and has side walls which protrude beyond the transmission and rest on the pedestal. The second housing part is fastened on the first housing part on an end side without any touching contact with the pedestal.

SUMMARY OF INVENTION

One problem with existing mill drive systems is the brief interruption in the drive train as a result of, for example, a power supply failure, which may bring about torque peaks which are damaging to the toothing and which can be a multiple of a transmission torque.

An object of the claimed invention is to provide a mill drive system which makes it possible to avoid damage to the transmission as a result of brief interruptions in the drive train and enables operation with little wear.

This object is achieved by a mill drive system and by a geared motor according to the independent claims. Advantageous developments of the present invention are specified in the dependent claims.

The mill drive system according to the invention comprises a transmission which can be arranged beneath a milling table and has at least one planetary and/or spur gear stage as well as a vertical shaft position. In addition, an electric motor is integrated in a housing of the transmission and is connected to a lubricant supply circuit of the transmission. The rotor and the stator of the motor have vertically extending axes. Cooling of the motor is performed by means of lubricant circulating through the transmission. Furthermore, a lubricating-oil-proof sheath for rotor and/or stator windings of the motor for sealing with respect to lubricant circulating within the housing is provided. Furthermore, the mill drive system according to the invention comprises a converter with an associated regulation device for backlash-free speed regulation of the motor.

Owing to the fact that the motor is integrated in the lubricant circuit of the transmission, it is possible to dispense with complex ventilation measures for efficient cooling of the motor. By using a converter for regulating the motor speed, decoupling between the power supply system supply and the motor torque is achieved. In this way, damage to the toothing in the event of short interruptions as a result of a power supply system failure can be avoided since no backlash in the direction of rotation in the transmission is caused by a power supply system failure as a result of the speed regulation of the motor according to the invention. By virtue of the milling table, the transmission and the motor being arranged completely vertically, it is also possible to dispense with comparatively expensive bevel gear transmissions. Owing to the fact that bevel gear transmissions and air cooling of the motor are dispensed with, noise emissions are also markedly reduced.

By using a converter, a large number of application-specific transmission variants with a reduced number of toothing component types can be realized. By virtue of the speed regulation, the respective processing process can furthermore be operated at an optimal operating point with the mill drive system according to the invention. As a result, the efficiency of the milling process is improved. In turn, this enables a reduction in power consumption.

Corresponding to a preferred configuration of the present invention, seals are now only provided on an output actuator, on lubricant supply lines, on electrical power supply lines and on at least one supply line for a measuring device. This makes it possible to further reduce mechanical components and contributes to increased reliability as a result.

Preferably, at least one axially extending opening for a lubricant discharge from the transmission into a lubricant collecting region or a tank is provided in a rotor mount. Such openings can also be used for fitting purposes by virtue of, for example, three or four guide rails being inserted into the openings in the rotor mount, through which guide rails the rotor mount is guided during fitting. By means of sliding blocks on the guide rails, the rotor can be moved to the intended position and fixed there. Corresponding to an alternative embodiment of the present invention, the housing of the transmission can be divided, or the motor can be fitted on a removable transmission base. As an alternative to this, the motor can be inserted through an opening in the transmission base and fastened on the housing of the transmission instead of on the transmission base.

Corresponding to an advantageous development of the present invention, the motor is a permanent magnet synchronous machine, whose rotor magnet system has been welded into a stainless steel shell. Since no thermal losses are produced at the rotor in this way, no rotor cooling is required. As an alternative to a permanent magnet synchronous machine, the motor can also be in the form of a squirrel-cage machine.

The transmission motor according to the invention comprises a transmission with at least one planetary and/or spur gear stage, which transmission has either a vertical shaft position or a horizontal shaft position. In addition, an electric motor is integrated in a housing of the transmission and is connected to a lubricant supply circuit of the transmission. The rotor and the stator of the motor have axes extending parallel to the shaft position of the transmission. Cooling of the motor is performed by means of lubricant circulating through the transmission. Furthermore, a lubricating-oil-proof sheath for rotor and/or stator windings of the motor for sealing with respect to lubricant circulating within the housing is provided. The geared motor according to the invention furthermore has a converter with an associated regulation device for backlash-free speed regulation of the motor.

BRIEF DESCRIPTION OF THE DRAWINGS

The present invention will be explained in more detail below with reference to an exemplary embodiment and the drawing, in which.

DETAILED DESCRIPTION OF INVENTION

Figure 1:
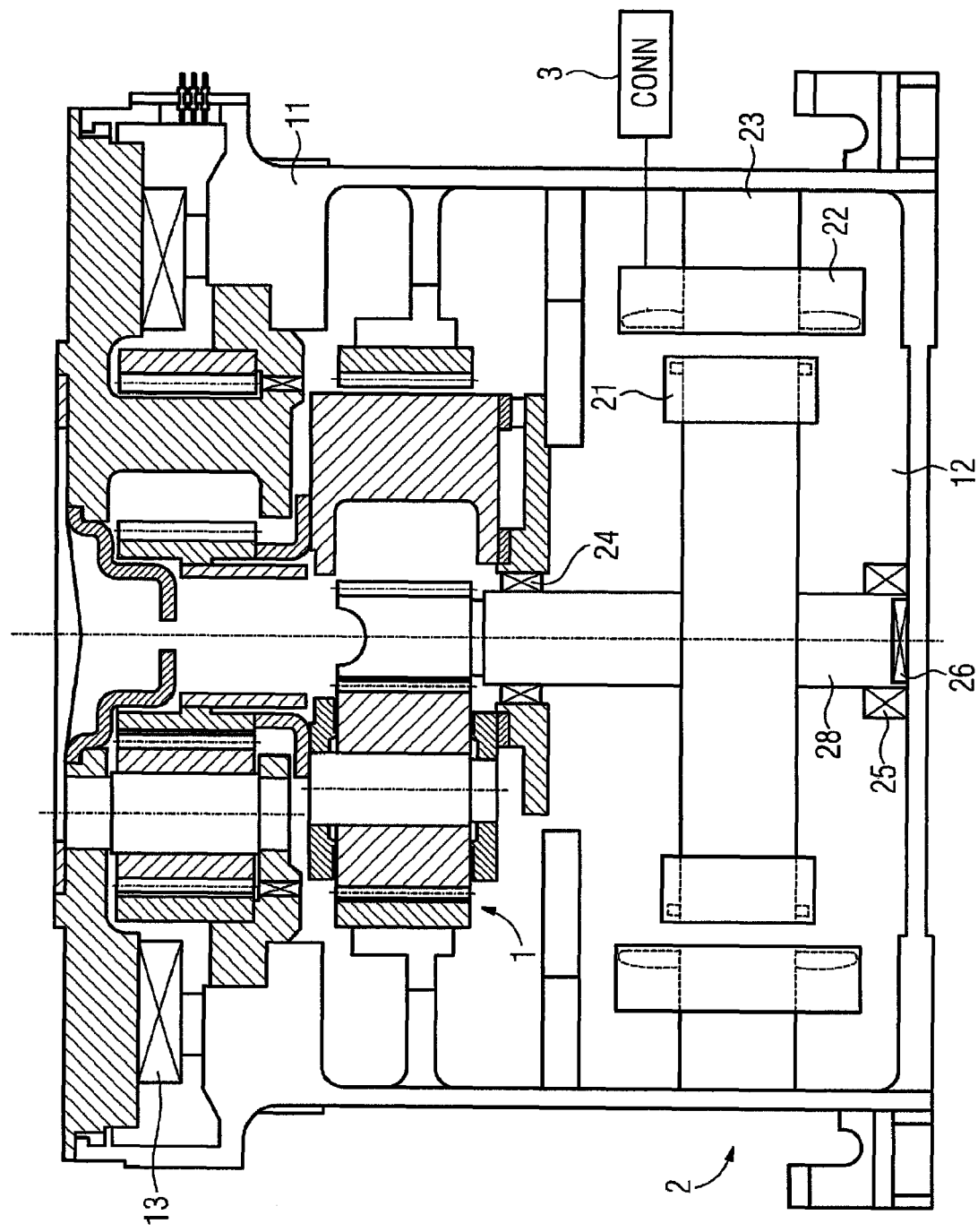
FIG. 1 shows a mill drive system according to the invention in a sectional illustration.

The mill drive system illustrated in FIG. 1 comprises a transmission 1, which is arranged beneath a milling table and has two planetary gear stages. Both the input-side planetary gear stage and the output-side planetary gear stage have a vertical shaft position. Both planetary gear stages each comprise a ring gear, a planet carrier with planet gears mounted therein and a sun gear. The ring gears of the planetary gear stages are connected fixedly to a transmission housing 11. The planet carrier of the output-side planetary gear stage can be connected to the milling table and is mounted by means of an axial bearing 13. The sun gear of the input-side planetary gear stage is connected to a rotor shaft 28 of an electric motor 2, which is integrated in the transmission housing 11 and comprises a rotor 21 and a stator 22 which radially surrounds said rotor 21. The rotor 21 and the stator 22 have vertically extending axes.

The rotor shaft 28 is mounted by means of a radial bearing 24, which is arranged between the motor 2 and the transmission 1, a radial bearing 25, which is arranged beneath the motor 2 in a lubricant sump 12, and an axial bearing 26, which is likewise arranged beneath the motor 2. In this way, very good centering of the rotor 21 is possible in the case of a relatively short rotor shaft 28. The rotor shaft 28 and the sun gear of the input-side planetary gear stage are preferably connected via a clutch which is arranged below or above the motor 2. Furthermore, in the present exemplary embodiment, the planet carrier of the input-side planetary gear stage and the sun gear of the output-side planetary gear stage are connected to one another.

The motor 2 is connected to a lubricant supply circuit of the transmission 1, in which lubricant is pumped out of the lubricant sump 12 to lubrication points in the transmission 1 and, from there, runs away into the lubricant sump 12 via the motor 2. In this way, cooling of the motor 2 is performed by means of lubricant circulating through the transmission 1. At least one lubricant supply channel (not illustrated explicitly in the figures) is in this case passed to the stator cooling plates 23, against which lubricant circulating through the transmission 1 can flow. In addition, in a targeted manner, lubricating oil can be sprayed in order to cool the stator 22, said lubricating oil being delivered by cooling devices of the stator 22.

Figure 2:
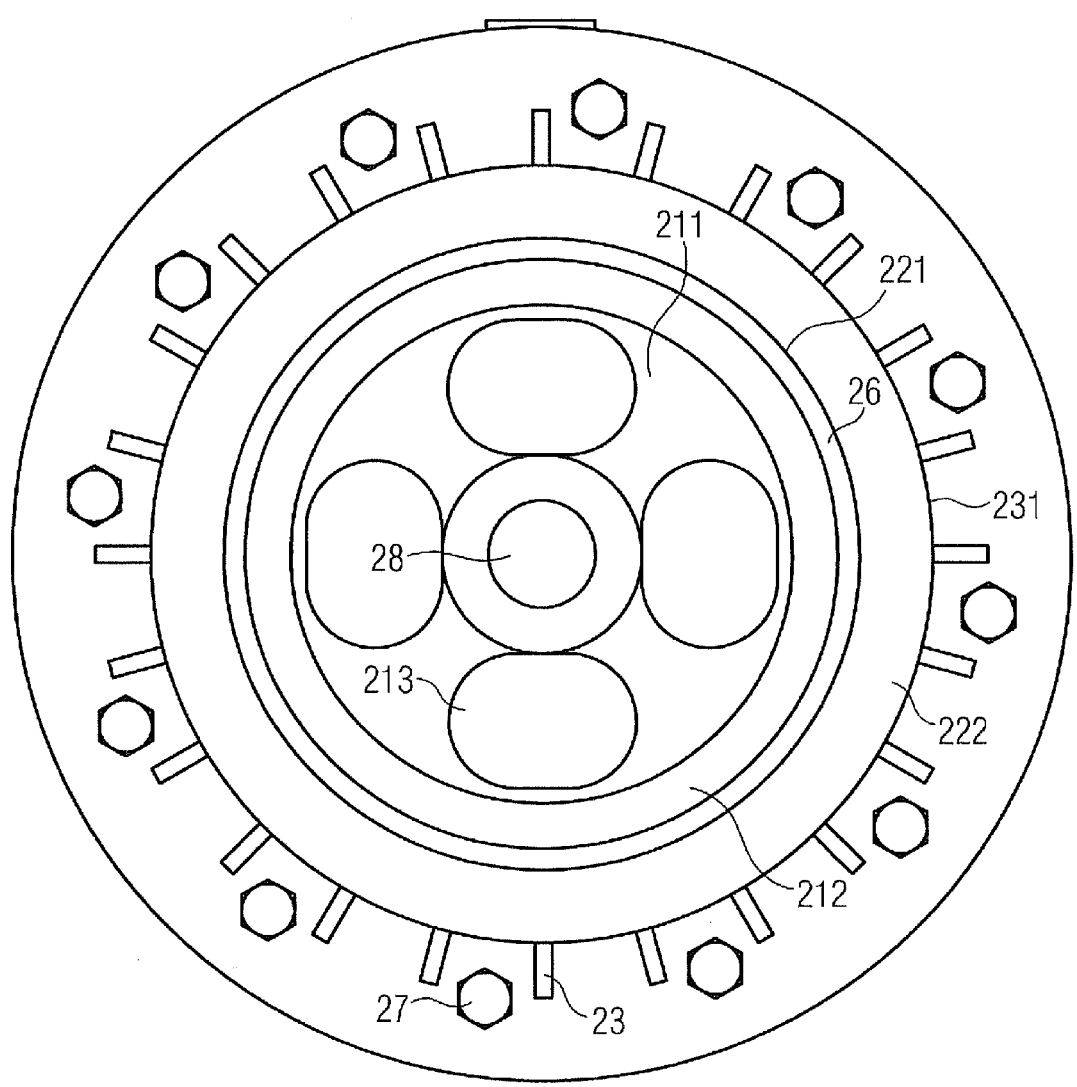
FIG. 2 shows a schematic illustration of an electric motor of the mill drive system shown in FIG. 1 in a plan view.

It can be seen from FIG. 2 that a lubricating-oil-proof sheath 212 of the rotor 21 is provided on a rotor mount 211 in order to seal said rotor off from lubricant circulating within the housing. In a corresponding manner, a lubricating-oil-proof sheath 221 of a stator laminate stack 222, which comprises windings of the stator 22, adjoins an air gap 26 between the rotor 21 and the stator 22 in the radial direction. It is not necessary for the air gap of the motor 2 to be markedly increased in size since said air gap is only subject to a small increase in size as a result of the lubricating-oil-proof sheaths.

A sleeve is provided in order to encapsulate the stator 22. In addition to the sleeve, the stator 22 has a clamping flange, a clamping element and an elastic seal. With the aid of the clamping element, the elastic seal is pressed onto the clamping flange and the sleeve. Any suitable stator housing part can be used for encapsulating the stator 22 by virtue of the elastic seal exerting a pressure as a result of a prestress on said stator housing part. Further details in relation to the encapsulation of the rotor 21 and the stator 22 can be gleaned from the earlier German patent application DE 10 2009 034 158.7, the disclosure of which is hereby incorporated by reference.

The stator 22, as shown in FIG. 2, is surrounded on its outer circumference by cooling faces 231, against which lubricant can likewise flow and from which the stator cooling plates 23 extend radially outwards. In addition, a plurality of fastening points 27 for screwing the stator 22 to the transmission housing are provided on the stator 22 in the circumferential direction. A plurality of axially extending openings 213 for a lubricant discharge from the transmission 1 into the lubricant sump 12 are provided in the rotor mount 211 and are arranged around the rotor shaft 28. Furthermore, in the present exemplary embodiment, the motor 2 is a permanent magnet synchronous machine whose rotor magnet system has been welded into a stainless steel shell. This makes particularly low electrical losses possible.

The mill drive system illustrated in FIG. 1 also has a converter 3 with an associated regulating device for backlash-free speed regulation of the motor 2, with the result that there is no play between tooth flanks of the transmission 1 in the direction of rotation. Mechanical natural frequencies of a mill/transmission/motor system are not critical in the case of the use of the converter 3 as a result of decoupling of system components. Tooth flanks of the transmission 1 are in this case held under a constant frictional connection by virtue of a minimum torque being applied. As a result, direction-changing loads on the tooth flanks are largely suppressed.

Preferably, an outer diameter of the motor 2 is smaller than an inner diameter of the ring gears of the planetary gear stages. This results in a design of the mill drive system which is simple in terms of manufacture. As an alternative to this, an outer diameter of the rotor 21 can be smaller than the inner diameter of the ring gears and the stator 22 can be manufactured from a plurality of segments extending in the circumferential direction.

The application of the present invention is not restricted to the exemplary embodiment described.

The invention claimed is:

1. A mill drive system, comprising:
 a transmission with a vertical shaft position and with at least one planetary and/or spur gear stage;
 a lubricant supply circuit of the transmission, a lubricant circulating through the transmission;
 an electric motor integrated in a housing of the transmission and being connected to the lubricant supply circuit of the transmission, the electric motor comprising a rotor and a stator with vertically extending axes, and wherein the electric motor is cooled by the lubricant circulating through the transmission,
 a lubricating-oil-proof sheath for rotor and/or stator windings of the electric motor for sealing with respect to the lubricant; and
 a converter with a control unit for backlash-free speed control of the electric motor.

2. The mill drive system as claimed in claim 1, wherein the transmission is arranged beneath a milling table of the mill drive system.

3. The mill drive system as claimed in claim 2, wherein the electric motor is arranged beneath the transmission, and wherein a lubricant collecting tank is provided beneath the electric motor.

4. The mill drive system as claimed in claim 3, wherein a rotor mount comprises at least one axially extending opening for a lubricant discharge from the transmission into the lubricant collecting tank.

5. The mill drive system as claimed in claim 1, wherein a lubricant supply channel is passed to at least one stator cooling plate, the lubricant circulating through the transmission flowing against the at least one stator cooling plate.

6. The mill drive system as claimed in claim 1, wherein the electric motor is arranged beneath the transmission, and wherein a lubricant collecting tank is provided beneath the electric motor.

7. The mill drive system as claimed in claim 6, wherein a rotor mount comprises at least one axially extending opening for a lubricant discharge from the transmission into the lubricant collecting tank.

8. The mill drive system as claimed in claim 1, wherein seals are provided only on an output actuator, on lubricant supply lines, on electrical power supply lines and on at least one supply line for a measuring device.

9. The mill drive system as claimed in claim 1, wherein an outer diameter of the electric motor is smaller than an inner diameter of a ring gear of the at least one planetary and/or spur gear stage.

10. The mill drive system as claimed in claim 1, wherein an outer diameter of the electric rotor is smaller than an inner diameter of a ring gear of the at least one planetary gear stage.

11. The mill drive system as claimed in claim 1, wherein the stator is manufactured from a plurality of segments extending in a circumferential direction.

12. The mill drive system as claimed in claim 1, wherein the electric motor is a permanent magnet synchronous motor, a rotor magnet system being welded into a stainless steel shell.

13. A geared motor for a mill drive system, comprising:
 a transmission with a vertical shaft position or a horizontal shaft position and with at least one planetary and/or spur gear stage;
 a lubricant supply circuit of the transmission, a lubricant circulating through the transmission;
 an electric motor integrated in a housing of the transmission and being connected to a lubricant supply circuit of the transmission, the electric motor comprising a rotor and a stator with axes extending parallel to the shaft position of the transmission, and wherein the electric motor is cooled by the lubricant circulating through the transmission;
 a lubricating-oil-proof sheath for rotor and/or stator windings of the electric motor for sealing with respect to the lubricant; and
 a converter with a control unit for backlash-free speed control of the electric motor.

14. The geared motor as claimed in claim 13, wherein a lubricant supply channel is passed to at least one stator cooling plate, the lubricant circulating through the transmission flowing against the at least one stator cooling plate.

15. The geared motor as claimed in claim 13, wherein the electric motor is arranged beneath the transmission, and wherein a lubricant collecting tank is provided beneath the electric motor.

16. The geared motor as claimed in claim 15, wherein a rotor mount comprises at least one axially extending opening for a lubricant discharge from the transmission into the lubricant collecting tank.

17. The geared motor as claimed in claim 13, wherein an outer diameter of the electric motor is smaller than an inner diameter of a ring gear of the at least one planetary and/or spur gear stage.

18. The geared motor as claimed in claim 13, wherein an outer diameter of the electric rotor is smaller than an inner diameter of a ring gear of the at least one planetary gear stage.

19. The geared motor as claimed in claim 13, wherein the stator is manufactured from a plurality of segments extending in a circumferential direction.

20. The geared motor as claimed in claim 13, wherein the electric motor is a permanent magnet synchronous motor, a rotor magnet system being welded into a stainless steel shell.

* * * * *